(12) United States Patent
Wakimoto et al.

(10) Patent No.: US 11,152,673 B2
(45) Date of Patent: Oct. 19, 2021

(54) SECONDARY BATTERY

(71) Applicant: SANYO Electric Co., Ltd., Daito (JP)

(72) Inventors: Ryoichi Wakimoto, Hyogo (JP); Hiroshi Takabayashi, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 232 days.

(21) Appl. No.: 16/209,568

(22) Filed: Dec. 4, 2018

(65) Prior Publication Data
US 2019/0181417 A1 Jun. 13, 2019

(30) Foreign Application Priority Data
Dec. 12, 2017 (JP) .............................. JP2017-237304

(51) Int. Cl.
| H01M 50/574 | (2021.01) |
| H01M 50/103 | (2021.01) |
| H01M 50/543 | (2021.01) |
| H01M 50/572 | (2021.01) |
| H01M 10/04 | (2006.01) |
| H01M 50/15 | (2021.01) |
| H01M 50/169 | (2021.01) |
| H01M 50/172 | (2021.01) |
| H01M 50/209 | (2021.01) |

(Continued)

(52) U.S. Cl.
CPC ..... *H01M 50/572* (2021.01); *H01M 10/0436* (2013.01); *H01M 50/103* (2021.01); *H01M 50/15* (2021.01); *H01M 50/169* (2021.01); *H01M 50/172* (2021.01); *H01M 50/209* (2021.01); *H01M 50/543* (2021.01); *H01M 50/557* (2021.01); *H01M 2004/027* (2013.01); *H01M 2004/028* (2013.01); *H01M 2200/103* (2013.01)

(58) Field of Classification Search
None
See application file for complete search history.

(56) References Cited

U.S. PATENT DOCUMENTS

| 2002/0098413 A1* | 7/2002 | Hulbert | ................ | H01H 85/044 |
| | | | | 429/178 |
| 2013/0266830 A1* | 10/2013 | Byun | ...................... | H01M 2/34 |
| | | | | 429/61 |

(Continued)

FOREIGN PATENT DOCUMENTS

JP 2015-8115 A 1/2015

*Primary Examiner* — Tracy M Dove
(74) *Attorney, Agent, or Firm* — Westerman, Hattori, Daniels & Adrian, LLP

(57) ABSTRACT

A positive electrode collector has a part connected to a positive electrode terminal and a part connected to a positive electrode tab. In the positive electrode collector, a fuse portion is provided between the part connected to the positive electrode terminal and the part connected to the positive electrode tab. In the positive electrode collector, a region closer to the part connected to the positive electrode terminal than the fuse portion is referred to as a first region, and a region closer to the part connected to the positive electrode tab than the fuse portion is referred to as a second region. An insulating plate as an insulating member disposed between the positive electrode collector and an electrode body is connected to the second region, and the second region is prevented from moving toward the first region after the fuse portion blows.

12 Claims, 14 Drawing Sheets

(51) Int. Cl.
*H01M 50/557* (2021.01)
*H01M 4/02* (2006.01)

(56) References Cited

U.S. PATENT DOCUMENTS

| | | | |
|---|---|---|---|
| 2014/0272490 A1* | 9/2014 | Han | H01M 2/34 |
| | | | 429/61 |
| 2014/0377638 A1 | 12/2014 | Kwak et al. | |
| 2016/0099457 A1 | 4/2016 | Park et al. | |
| 2016/0336581 A1* | 11/2016 | Kwak | H01M 2/34 |
| 2018/0040918 A1* | 2/2018 | Guen | H01M 2/22 |

* cited by examiner

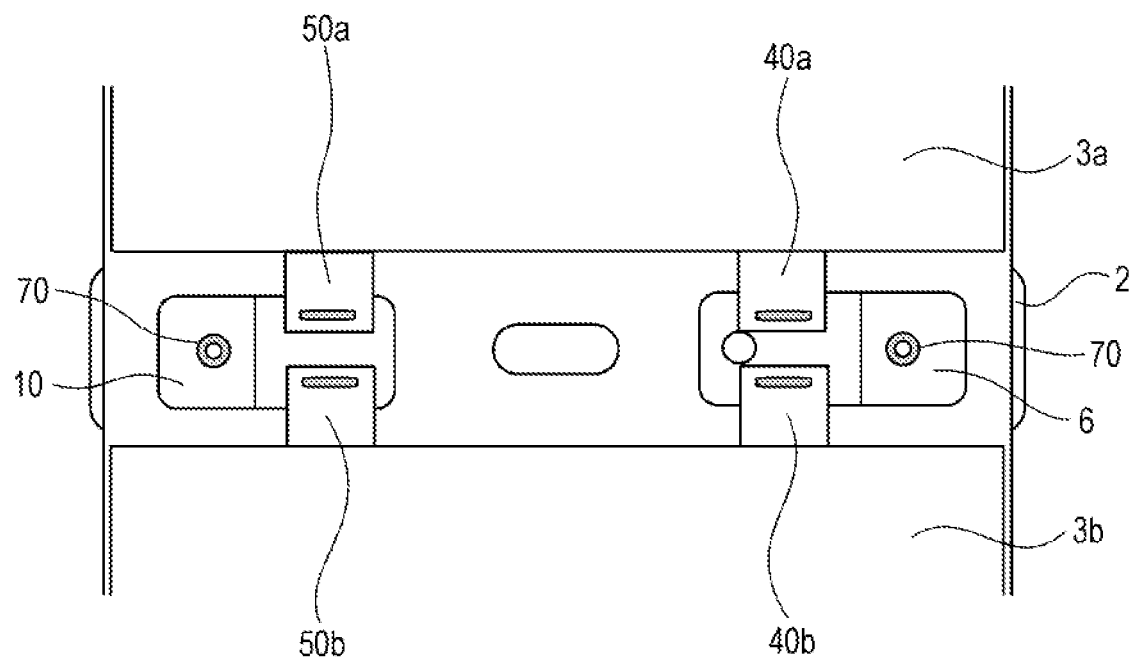

SECONDARY BATTERY

CROSS REFERENCE TO RELATED APPLICATIONS

The present invention application claims priority to Japanese Patent Application No. 2017-237304 filed in the Japan Patent Office on Dec. 12, 2017, the entire contents of which are incorporated herein by reference.

BACKGROUND OF THE INVENTION

Field of the Invention

The present invention relates to a secondary battery.

Description of Related Art

Secondary batteries such as alkaline secondary batteries and nonaqueous electrolyte secondary batteries are used in power sources for driving electric vehicles (EV), hybrid electric vehicles (HEV, PHEV), and the like.

In these secondary batteries, a battery case is formed by a bottomed tubular prismatic outer casing having an opening and a sealing plate that seals the opening. An electrode body including positive electrode plates, negative electrode plates, and separators is accommodated in the battery case together with an electrolyte. A positive electrode terminal and a negative electrode terminal are attached to the sealing plate.

The positive electrode terminal is electrically connected to the positive electrode plate through a positive electrode collector, and the negative electrode terminal is electrically connected to the negative electrode plate through a negative electrode collector.

In a secondary battery, it has been proposed to provide a fuse in a collector that electrically connects a terminal and an electrode body (Japanese Published Unexamined Patent Application No. 2015-8115 (Patent Document 1)).

BRIEF SUMMARY OF THE INVENTION

It is an object of the present invention to provide a highly reliable secondary battery in which a conductive path is prevented from being formed again after a fuse portion provided in a collector blows.

In an aspect of the present invention, a secondary battery includes an electrode body having a positive electrode plate and a negative electrode plate, an outer casing having an opening and accommodating the electrode body, a sealing plate sealing the opening, a terminal attached to the sealing plate, and a collector electrically connecting the positive electrode plate or the negative electrode plate and the terminal. The positive electrode plate or the negative electrode plate has a tab. The collector has a part connected to the tab and a part connected to the terminal. In the collector, a fuse portion is provided between the part connected to the tab and the part connected to the terminal. An insulating member is disposed at least one of between the collector and the electrode body and between the sealing plate and the collector. A region in the collector closer to the part connected to the terminal than the fuse portion is referred to as a first region. A region in the collector closer to the part connected to the tab than the fuse portion is referred to as a second region. The secondary battery has a movement prevention structure that prevents the second region from moving so as to approach at least one of the sealing plate and the first region after the fuse portion blows. The movement prevention structure includes the second region and the insulating member.

With the configuration of the secondary battery of this aspect of the present invention, after the fuse portion blows, the second region, which is a region in the collector closer to the part connected to the tab than the fuse portion, can be prevented from moving in the battery case. Therefore, after the fuse portion blows, the second region can be prevented from moving in the battery case and being electrically connected to the sealing plate or the first region. Therefore, a highly reliable secondary battery in which a conductive path is prevented from being formed after a fuse portion blows is obtained.

The tab may be disposed on the surface of the electrode body on the sealing plate side. Thereby, a secondary battery having a higher energy density is obtained.

The insulating member may be disposed between the collector and the electrode body. Thereby, unintentional contact between the collector and the electrode body can be prevented.

The second region may be provided with a through-hole or a cutout portion, and a part of the insulating member may be disposed in the through-hole or the cutout portion. Thereby, after the fuse portion blows, the second region can be prevented effectively from moving in the battery case.

An insulating sheet may be disposed between the sealing plate and the second region. Thereby, the sealing plate and the second region can be prevented from coming into contact with each other.

The insulating member may be connected to the first region. Thereby, after the fuse portion blows, the second region can be prevented more effectively from moving in the battery case.

The insulating member may have a main body portion disposed along the surface of the electrode body on the sealing plate side and a protruding portion protruding from the main body portion toward the sealing plate, and a part of the protruding portion may be located closer to the sealing plate than the surface of the first region on the sealing plate side. Thereby, after the fuse portion blows, the second region can be prevented more effectively from coming into contact with the sealing plate.

A part of the protruding portion may be disposed between the first region and the sealing plate. Thereby, after the fuse portion blows, the second region can be prevented more effectively from coming into contact with the sealing plate.

The insulating member may be disposed between the sealing plate and the collector. Thereby, the collector and the sealing plate can be prevented more effectively from coming into contact with each other.

The second region may be provided with a through-hole or a cutout portion, and a part of the insulating member may be disposed in the through-hole or the cutout portion. Thereby, after the fuse portion blows, the second region can be prevented effectively from moving in the battery case.

The insulating member may have a terminal through-hole, and the terminal may be disposed in the terminal through-hole.

The insulating member may be sandwiched between the terminal and the sealing plate.

The fuse portion may be covered by a resin member. Thereby, the fuse portion can be prevented effectively from being damaged or broken due to vibration or impact.

The electrode body may have a first tab group including a plurality of the tabs and a second tab group including a plurality of the tabs, and the first tab group and the second tab group may be curved in different directions. Thereby, a secondary battery having a higher energy density is obtained.

The present invention can provide a highly reliable secondary battery.

BRIEF DESCRIPTION OF THE SEVERAL VIEWS OF THE DRAWINGS

FIG. 8 shows a state in which the positive electrode collector is connected to the positive electrode terminal and the negative electrode collector is connected to the negative electrode terminal.

DETAILED DESCRIPTION OF THE INVENTION

The configuration of a prismatic secondary battery 20 as a secondary battery according to an embodiment will be described below. It should be noted that the present invention is not limited to the following embodiment.

Figure 1:
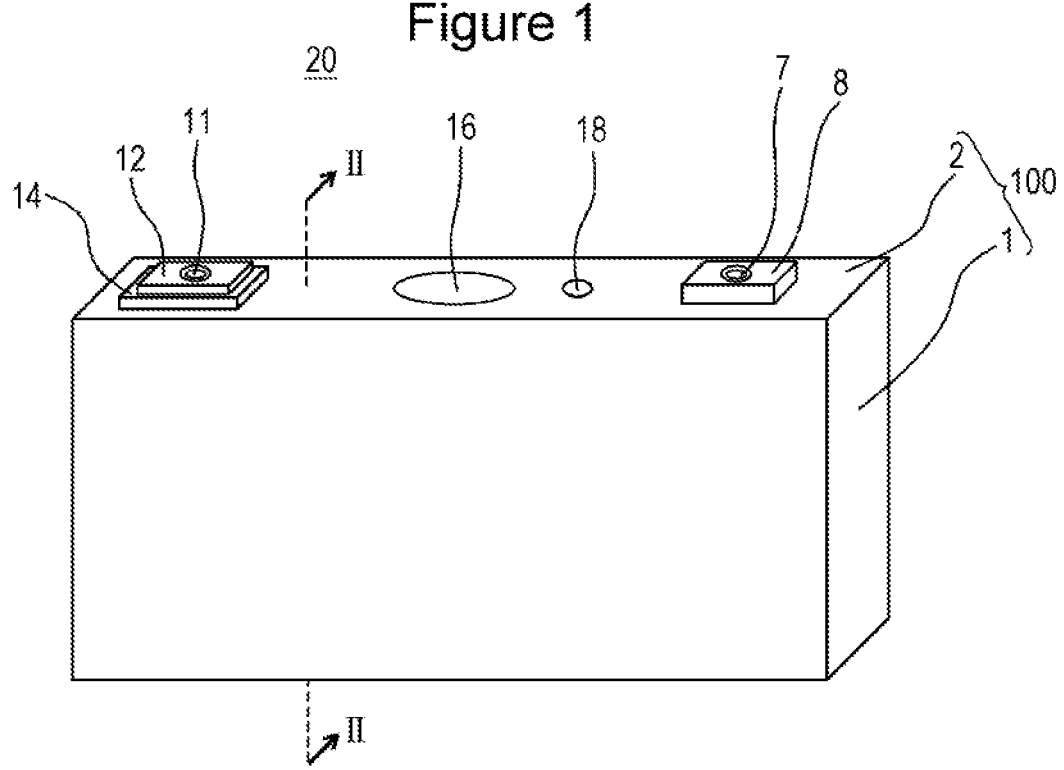
FIG. 1 is a perspective view of a secondary battery according to the embodiment.
Figure 2:
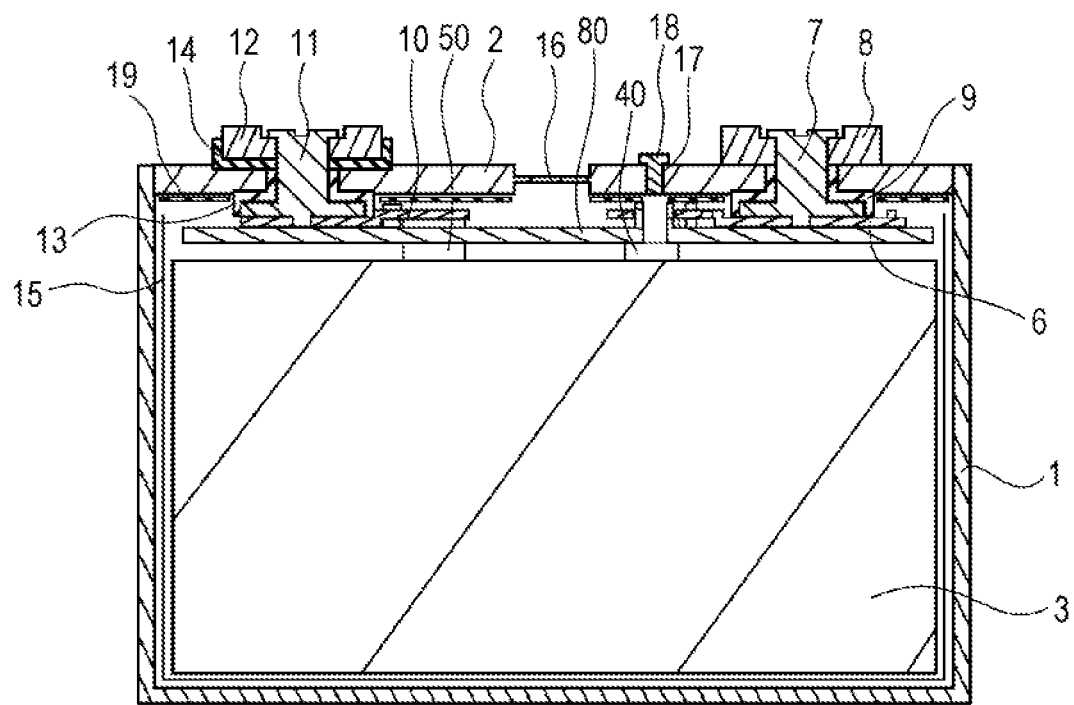
FIG. 2 is a cross-sectional view taken along line II-II of FIG. 1.

As shown in FIGS. 1 and 2, the prismatic secondary battery 20 includes a battery case 100 including a bottomed prismatic outer casing 1 having an opening and a sealing plate 2 that seals the opening of the prismatic outer casing 1. The prismatic outer casing 1 and the sealing plate 2 are preferably made of metal, for example, aluminum or an aluminum alloy. An electrode body 3 in which positive electrode plates and negative electrode plates are stacked with separators interposed therebetween is accommodated in the prismatic outer casing 1 together with an electrolyte. An electrode body holder 15 made of a resin sheet is disposed between the electrode body 3 and the prismatic outer casing 1.

A positive electrode tab 40 and a negative electrode tab 50 are provided at an end of the electrode body 3 on the sealing plate 2 side. The positive electrode tab 40 and the negative electrode tab 50 are disposed on the surface of the electrode body 3 on the sealing plate 2 side. The positive electrode tab 40 is electrically connected to a positive electrode terminal 7 and a positive electrode external conductive member 8 through the positive electrode collector 6. The negative electrode tab 50 is electrically connected to a negative electrode terminal 11 and a negative electrode external conductive member 12 through the negative electrode collector 10.

The positive electrode terminal 7 and the positive electrode external conductive member 8 are preferably made of metal, and more preferably made of aluminum or an aluminum alloy. The positive electrode external conductive member 8 is electrically connected to the sealing plate 2. An inner side insulating member 9 made of resin is disposed between the positive electrode terminal 7 and the sealing plate 2.

The negative electrode terminal 11 and the negative electrode external conductive member 12 are preferably made of metal. The negative electrode external conductive member 12 is preferably made of aluminum or an aluminum alloy. The negative electrode terminal 11 is more preferably made of copper or a copper alloy. Alternatively, the negative electrode terminal 11 may have a part made of aluminum or an aluminum alloy and a part made of copper or a copper alloy. In this case, it is preferable to connect the part made of copper or a copper alloy to the negative electrode collector 10 and connect the part made of aluminum or an aluminum alloy to the negative electrode external conductive member 12. An inner side insulating member 13 is disposed between the sealing plate 2 and the negative electrode terminal 11. An outer side insulating member 14 is disposed between the sealing plate 2 and the negative electrode external conductive member 12.

Between the sealing plate 2 and the electrode body 3, an insulating sheet 19 made of resin is disposed so as to face the sealing plate 2. The insulating sheet 19 is disposed between the sealing plate 2 and the positive electrode collector 6. The insulating sheet 19 is disposed between the sealing plate 2 and the negative electrode collector 10.

An insulating plate 80 as an insulating member is disposed between the positive electrode collector 6 and the electrode body 3 and between the negative electrode collector 10 and the electrode body 3.

The sealing plate 2 is provided with a gas discharge valve 16 that breaks when the pressure in the battery case 100 reaches a predetermined value or more and discharges the gas in the battery case 100 to the outside of the battery case 100. An electrolyte injection hole 17 is provided in the sealing plate 2. After electrolyte is injected into the battery case 100 through the electrolyte injection hole 17, the electrolyte injection hole 17 is sealed by a sealing member 18.

Next, a method for manufacturing the prismatic secondary battery 20 and details of each component will be described.

Positive Electrode Plate

Figure 3:
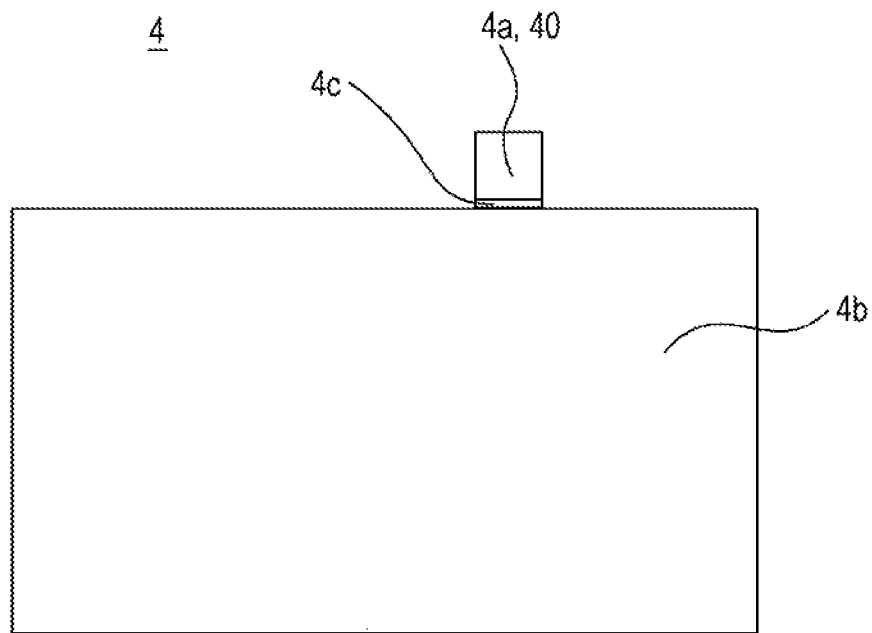
FIG. 3 is a plan view of a positive electrode plate according to the embodiment.

FIG. 3 is a plan view of a positive electrode plate 4. The positive electrode plate 4 has a main body portion in which a positive electrode active material mixture layers 4b containing a positive electrode active material is formed on both sides of a rectangular positive electrode substrate 4a. The positive electrode substrate 4a protrudes from the edge of the main body portion, and the protruded positive electrode substrate 4a forms the positive electrode tab 40. The positive electrode tab 40 may be a part of the positive electrode substrate 4a as shown in FIG. 3, or another member may be connected to the positive electrode substrate 4a to serve as the positive electrode tab 40. A part of the positive electrode tab 40 that is adjacent to the positive electrode active material mixture layer 4b is preferably provided with a positive electrode protective layer 4c having an electrical resistance higher than the electrical resistance of the positive electrode active material mixture layer 4b. As the positive electrode substrate 4a, a metal foil such as an aluminum foil or an aluminum alloy foil is preferably used. As the positive electrode active material, lithium transition metal complex oxide or the like is preferably used.

Negative Electrode Plate

Figure 4:
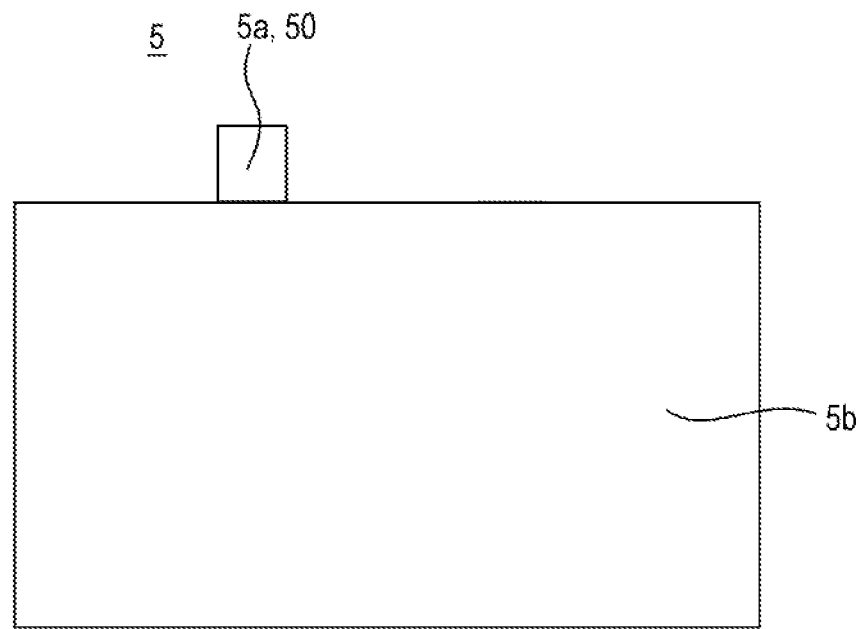
FIG. 4 is a plan view of a negative electrode plate according to the embodiment.

FIG. 4 is a plan view of a negative electrode plate 5. The negative electrode plate 5 has a main body portion in which a negative electrode active material mixture layer 5b containing a negative electrode active material is formed on both sides of a rectangular negative electrode substrate 5a. The negative electrode substrate 5a protrudes from the edge of the main body portion, and the protruded negative electrode substrate 5a forms a negative electrode tab 50. The negative electrode tab 50 may be a part of the negative electrode substrate 5a as shown in FIG. 4, or another member may be connected to the negative electrode substrate 5a to serve as the negative electrode tab 50. As the negative electrode substrate 5a, a metal foil such as a copper foil or a copper alloy foil is preferably used. As the negative electrode active material, a carbon material, a silicon material, or the like is preferably used.

Figure 5:
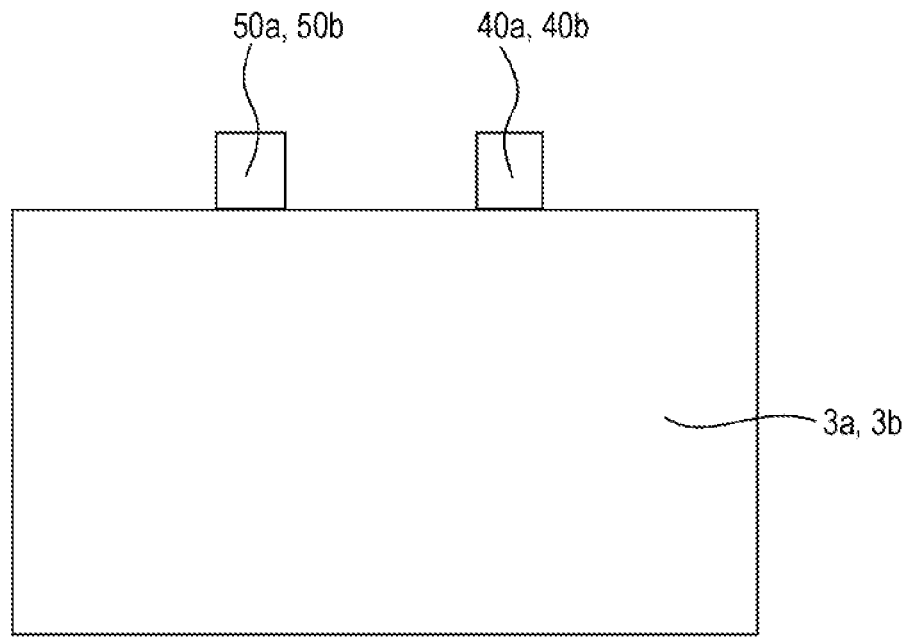
FIG. 5 is a plan view of an electrode body element according to the embodiment.

Fabrication of Electrode Body Element 50 positive electrode plates 4 and 51 negative electrode plates 5 are fabricated by the above-described method, and these are stacked with rectangular polyolefin separators therebetween to fabricate a stacked electrode body element. As shown in FIG. 5, a stacked electrode body element (first electrode body element 3a, second electrode body element 3b) has, at one end thereof, a positive electrode tab group in which positive electrode tabs 40 of positive electrode plates 4 are stacked (first positive electrode tab group 40a, second positive electrode tab group 40b), and a negative electrode tab group in which negative electrode tabs 50 of negative electrode plates 5 are stacked (first negative electrode tab group 50a, second negative electrode tab group 50b). Separators are disposed on both outer surfaces of the electrode body element, and the electrode plates and the separators can be fixed in a stacked state with a tape or the like. Alternatively, an adhesive layer may be provided on each separator so that the separators and the positive electrode plates 4, and the separators and the negative electrode plates 5 are adhered to each other.

The size in plan view of the separators is preferably the same as that of the negative electrode plates 5 or larger than that of the negative electrode plates 5. Each positive electrode plate 4 or each negative electrode plate 5 may be disposed between two separators, and after heat welding the peripheries of the separators, the positive electrode plates 4 and the negative electrode plates 5 may be stacked. Alternatively, a separator may be folded zigzag. It is also possible to roll a belt-like positive electrode plate and a belt-like negative electrode plate with a belt-like separator therebetween to form a rolled electrode body element.

Connecting Collector and Tab

Two electrode body elements are fabricated by the above-described method, and are respectively referred to as a first electrode body element 3a and a second electrode body element 3b. The first electrode body element 3a and the second electrode body element 3b may have exactly the same configuration or different configurations. Here, the plurality of positive electrode tabs 40 of the first electrode body element 3a form a first positive electrode tab group 40a. The plurality of negative electrode tabs 50 of the first electrode body element 3a form a first negative electrode tab group 50a. The plurality of positive electrode tabs 40 of the second electrode body element 3b form a second positive electrode tab group 40b. The plurality of negative electrode tabs 50 of the second electrode body element 3b form a second negative electrode tab group 50b.

Figure 6:
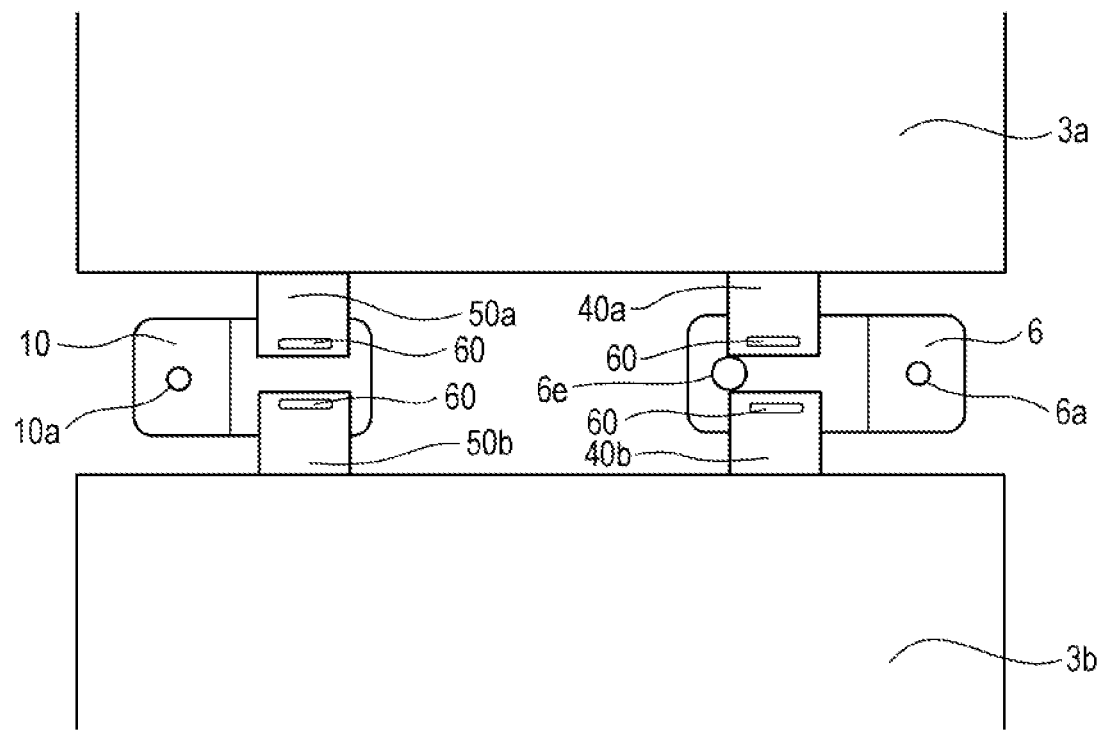
FIG. 6 shows a state in which positive electrode tab groups are connected to a positive electrode collector and negative electrode tab groups are connected to a negative electrode collector.

FIG. 6 shows a state in which the first positive electrode tab group 40a and the second positive electrode tab group 40b are connected to the positive electrode collector 6 and the first negative electrode tab group 50a and the second negative electrode tab group 50b are connected to the negative electrode collector 10. The positive electrode collector 6 and the negative electrode collector 10 are disposed between the first electrode body element 3a and the second electrode body element 3b. Then, the first positive electrode tab group 40a and the second positive electrode tab group 40b are disposed on the positive electrode collector 6. The first negative electrode tab group 50a and the second negative electrode tab group 50b are disposed on the negative electrode collector 10. The first positive electrode tab group 40a and the second positive electrode tab group 40b are welded and connected to the positive electrode collector 6, so that welded portions 60 are formed. The first negative electrode tab group 50a and the second negative electrode tab group 50b are welded and connected to the negative electrode collector 10, so that welded portions 60 are formed. The welding method is preferably ultrasonic welding or resistance welding. It is also possible to connect by laser welding. In the positive electrode collector 6, a collector opening 6e is provided at a position facing the electrolyte injection hole 17.

Attaching Parts to Sealing Plate

Figure 7A:
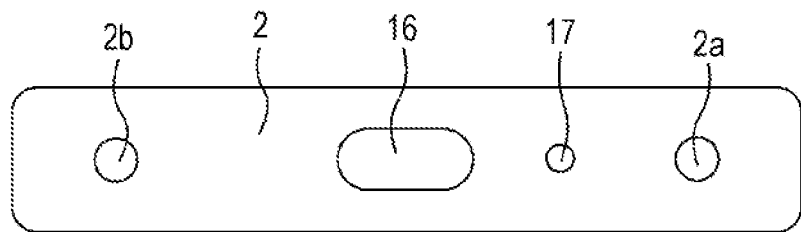
FIG. 7A shows the surface of a sealing plate on the electrode body side.
Figure 7B:
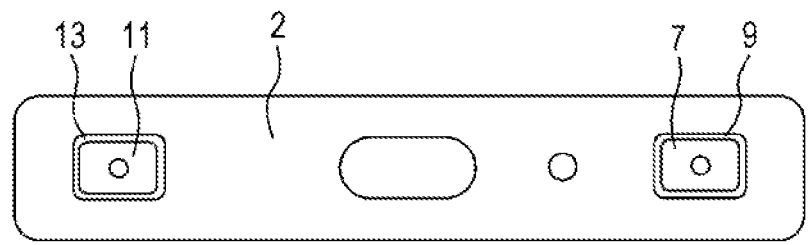
FIG. 7B shows a state after an inner side insulating member, a positive electrode terminal, and a negative electrode terminal are attached to the sealing plate.

A method for attaching the members to the sealing plate will be described with reference to FIGS. 7A to 7C. As shown in FIG. 7A, the sealing plate 2 has a positive electrode terminal mounting hole 2a and a negative electrode terminal mounting hole 2b. The positive electrode external conductive member 8 is disposed on the battery outer surface side around the positive electrode terminal mounting hole 2a, and the inner side insulating member 9 is disposed on the battery inner surface side around the positive electrode terminal mounting hole 2a. Then, the positive electrode terminal 7 is inserted from the battery inner surface side into the through-hole of the inner side insulating member 9, the positive electrode terminal mounting hole 2a, and the through-hole of the positive electrode external conductive member 8. Then, by caulking the tip of the positive electrode terminal 7, the positive electrode terminal 7 is attached to the sealing plate 2 as shown in FIGS. 2 and 7B. The outer side insulating member 14 and the negative electrode external conductive member 12 are disposed on the battery outer surface side around the negative electrode terminal mounting hole 2b, and the inner side insulating member 13 is disposed on the battery inner surface side around the negative electrode terminal mounting hole 2b. Then, the negative electrode terminal 11 is inserted from the battery inner surface side into the through-hole of the inner side insulating member 13, the negative electrode terminal mounting hole 2b, the through-hole of the outer side insulating member 14, and the through-hole of the negative electrode external conductive member 12. Then, by caulking the tip of the negative electrode terminal 11, the negative electrode terminal 11 is attached to the sealing plate 2.

Figure 7C:
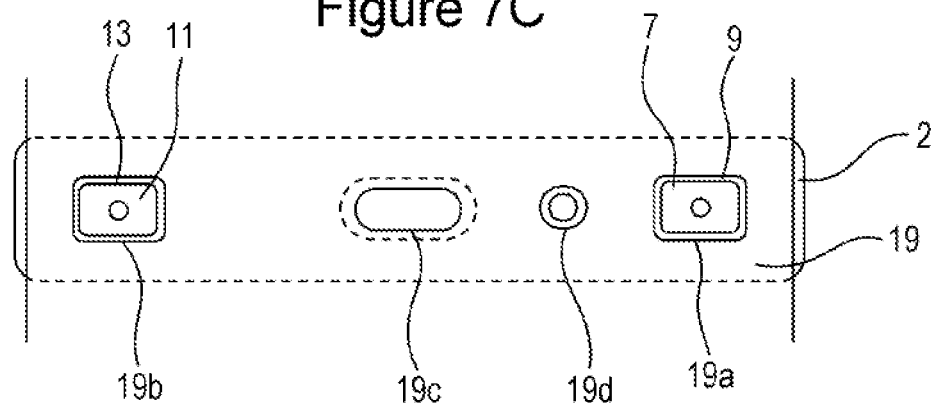
FIG. 7C shows a state in which an insulating sheet is disposed on the electrode body side of the sealing plate.

Thereafter, as shown in FIG. 7C, the insulating sheet 19 is disposed so as to face the battery inner surface of the sealing plate 2. The insulating sheet 19 has a first opening portion 19a, a second opening portion 19b, a third opening portion 19c, and a fourth opening portion 19d. The first opening portion 19a is disposed at a position corresponding to the positive electrode terminal 7. The second opening portion 19b is disposed at a position corresponding to the negative electrode terminal 11. The third opening portion 19c is disposed at a position corresponding to the gas discharge valve 16. The fourth opening portion 19d is disposed at a position corresponding to the electrolyte injection hole 17.

Connecting Terminal and Collector

As shown in FIGS. 2 and 8, the positive electrode collector 6 and the positive electrode terminal 7 are connected, and the negative electrode collector 10 and the negative electrode terminal 11 are connected. A connection protrusion 7d provided in a flange portion 7a of the positive electrode terminal 7 is disposed in a connection hole 6a provided in the positive electrode collector 6, and the positive electrode collector 6 and the positive electrode terminal 7 are welded by laser welding or the like to form a welded portion 70. A connection protrusion 11d provided in a flange portion 11a of the negative electrode terminal 11 is disposed in a connection hole 10a provided in the negative electrode collector 10, and the negative electrode collector 10 and the negative electrode terminal 11 are welded by laser welding or the like to form a welded portion 70.

Figure 9A:
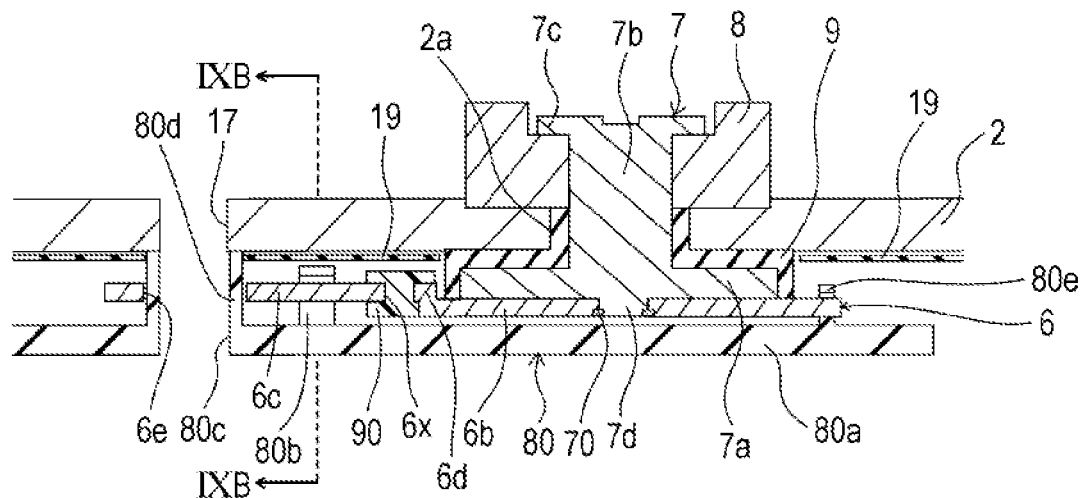
FIG. 9A is a cross-sectional view of the vicinity of the positive electrode terminal taken in the longitudinal direction of the sealing plate.
Figure 9B:
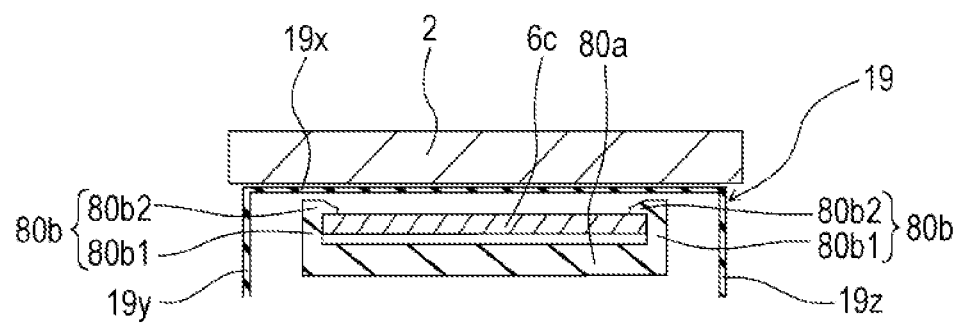
FIG. 9B is a cross-sectional view of the vicinity of the positive electrode terminal taken in the widthwise direction of the sealing plate.

As shown in FIGS. 9A and 9B, the positive electrode terminal 7 has the flange portion 7a disposed closer to the electrode body 3 than the sealing plate 2, and an insertion portion 7b that extends from the flange portion 7a to the outside of the battery and penetrates the positive electrode terminal mounting hole 2a. A caulking portion 7c is provided on the distal end side of the insertion portion 7b.

The positive electrode terminal 7 and the positive electrode tab groups 40 (first positive electrode tab group 40a and second positive electrode tab group 40b) are connected to the positive electrode collector 6. The positive electrode collector 6 is provided with a fuse portion 6x. The fuse portion 6x is a portion that blows when a large current flows through the prismatic secondary battery 20. A region in the positive electrode collector 6 that is closer to the part connected to the positive electrode terminal 7 than the fuse portion 6x is referred to as a first region 6b. A region in the positive electrode collector 6 that is closer to the part connected to the positive electrode tab groups 40 (first positive electrode tab group 40a and second positive electrode tab group 40b) than the fuse portion 6x is referred to as a second region 6c.

The cross-sectional area of the fuse portion 6x is smaller than that of the other part, and the fuse portion 6x blows when a large current flows. By providing the positive electrode collector 6 with an opening, a cutout portion, or a thin portion, a portion having a small cross-sectional area can be provided to form the fuse portion 6x. The fuse portion 6x is preferably covered by a resin member 90. Thereby, the positive electrode collector 6 can be prevented from being damaged in the vicinity of the fuse portion 6x due to vibration, impact, or the like. In addition, when the fuse portion 6x blows, the melted metal can be prevented from scattering.

The positive electrode collector 6 is provided with a stepped portion 6d. In the direction perpendicular to the sealing plate 2, a part of the positive electrode collector 6 that is connected to the positive electrode tabs 40 is located closer to the sealing plate 2 than a part of the positive electrode collector 6 that is connected to the positive electrode terminal 7. With such a configuration, a secondary battery having a higher energy density is obtained. The stepped portion 6d may be provided in either the first region 6b or the second region 6c. The stepped portion 6d may not be provided in the positive electrode collector 6.

A resin insulating plate 80 as an insulating member is disposed between the positive electrode collector 6 and the electrode body 3. The insulating plate 80 has a main body portion 80a disposed along the surface of the electrode body 3 on the sealing plate 2 side and first protruding portions 80b protruding from the main body portion 80a toward the sealing plate 2. The first protruding portions 80b are connected to the second region 6c of the positive electrode collector 6. Therefore, after the fuse portion 6x blows, the second region 6c of the positive electrode collector 6 is prevented from moving in the battery case 100. Therefore, after the fuse portion 6x blows, the second region 6c can be prevented from coming into contact with the first region 6b or the sealing plate 2, and a conductive path can be prevented from being formed.

FIG. 9B is a cross-sectional view taken along line IXB-IXB of FIG. 9A. The first protruding portions 80b are provided at both ends in the width direction of the insulating plate 80. The first protruding portions 80b each have a first vertical wall 80b1 extending from the main body portion 80a toward the sealing plate 2 and a first claw portion 80bb2 protruding horizontally from the first vertical wall 80b1. The first protruding portions 80b protrude closer to the sealing plate 2 than the surface of the second region 6c of the positive electrode collector 6 on the sealing plate 2 side. The first claw portions 80b2 of the insulating plate 80 are disposed between the sealing plate 2 and the second region 6c of the positive electrode collector 6.

When a large current flows through the prismatic secondary battery 20 due to a short circuit or the like and the fuse portion 6x provided in the positive electrode collector 6 blows, the conductive path is cut. However, if the second region 6c of the positive electrode collector 6 is electrically connected to the sealing plate 2, a conductive path is formed again. Even if the insulating sheet 19 is disposed between the sealing plate 2 and the positive electrode collector 6, the insulating sheet 19 may be broken or damaged by the second region 6c which has become high-temperature. By disposing a part of the insulating plate 80 between the sealing plate 2 and the second region 6c, the second region 6c can be prevented more effectively from coming into contact with the sealing plate 2.

In the main body portion 80a of the insulating plate 80, a first opening 80c is provided at a position facing the electrolyte injection hole 17 of the sealing plate 2. On the edge of the first opening 80c, a tubular protruding portion 80d extending toward the sealing plate 2 is provided. The electrolyte injected through the electrolyte injection hole 17 is injected into the electrode body 3 through the inside of the tubular protruding portion 80d.

The tubular protruding portion 80d is disposed in the collector opening 6e provided in the positive electrode collector 6. Therefore, after the fuse portion 6x blows, the second region 6c is prevented from moving toward the first region 6b and coming into contact with the first region 6b. The tubular protrusion 80d is preferably in contact with the sealing plate 2.

The main body portion 80a of the insulating plate 80 is provided with second protruding portions 80e. The second protruding portions 80e are connected to the first region 6b of the positive electrode collector 6. Thereby, after the fuse portion 6x blows, the first region 6b can be prevented more reliably from moving toward the second region 6c. The shape of the second protruding portions 80e may be the same as that of the first protruding portions 80b.

The insulating sheet 19 has an insulating sheet first region 19x disposed between the sealing plate 2 and the electrode body 3, an insulating sheet second region 19y disposed between one outer surface of the electrode body 3 and the prismatic outer casing 1, and an insulating sheet third region 19z disposed between the other outer surface of the electrode body 3 and the prismatic outer casing 1.

It is not necessary to provide both the first protruding portions 80b and the tubular protruding portion 80d. The second protruding portions 80e may be omitted. The shape of the first protruding portions 80b is not particularly limited. For example, the positive electrode collector 6 may be provided with openings or cutout portions, and the first protruding portions 80b may be disposed in the openings or the cutout portions.

A gap may be formed between the inner surface of the collector opening 6e of the positive electrode collector 6 and the outer surface of the tubular protruding portion 80d. In this case, the size of the gap between a part of the tubular protruding portion 80d that is disposed in the collector opening 6e and is closest to the fuse portion 6x and the inner surface of the collector opening 6e is preferably smaller than the size of the gap generated between the first region 6b and the second region 6c when the fuse portion 6x blows.

Figure 10A:
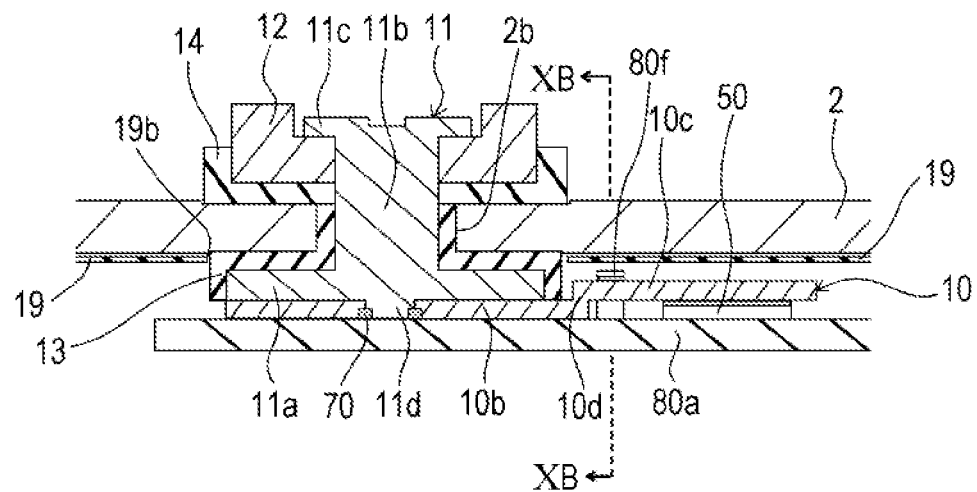
FIG. 10A is a cross-sectional view of the vicinity of the negative electrode terminal taken in the longitudinal direction of the sealing plate.
Figure 10B:
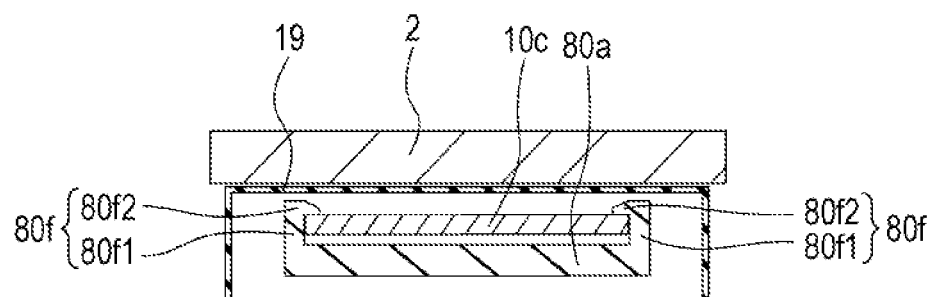
FIG. 10B is a cross-sectional view of the vicinity of the negative electrode terminal taken in the widthwise direction of the sealing plate.

As shown in FIGS. 10A and 10B, the negative electrode terminal 11 has a flange portion 11a disposed closer to the electrode body 3 than the sealing plate 2, and an insertion portion 11b that extends from the flange portion 11a to the outside of the battery and penetrates the negative electrode terminal mounting hole 2b. A caulking portion 11c is provided on the distal end side of the insertion portion 11b. The negative electrode collector 10 has a terminal connecting portion 10b to which the negative electrode terminal 11 is connected, and a tab connecting portion 10c to which the negative electrode tab groups 50 (first negative electrode tab group 50a and second negative electrode tab group 50b) are connected. In the direction perpendicular to the sealing plate 2, the distance between the sealing plate 2 and the tab connecting portion 10c is smaller than the distance between the sealing plate 2 and the terminal connecting portion 10b. The terminal connecting portion 10b and the tab connecting portion 10c are connected by a connecting portion 10d.

The insulating plate 80 is disposed between the negative electrode collector 10 and the electrode body 3. The insulating plate 80 has the main body portion 80a disposed along the surface of the electrode body 3 on the sealing plate 2 side. The main body portion 80a has a third protruding portions 80f. The third protruding portions 80f are connected to the negative electrode collector 10. The position where the third protruding portions 80f are connected is not particularly limited, but is preferably the tab connecting portion 10c. Since the insulating plate 80 is connected to the negative electrode collector 10, after the fuse portion 6x of the positive electrode collector 6 blows, the second region 6c of the positive electrode collector 6 can be prevented more effectively from moving in the battery case 100. The insulating plate 80 and the negative electrode collector 10 may not be connected.

FIG. 10B is a cross-sectional view taken along line XB-XB of FIG. 10A. The third protruding portions 80f are provided at both ends in the width direction of the insulating plate 80. The third protruding portions 80f each have a third vertical wall 80f1 extending from the main body portion 80a toward the sealing plate 2 and a third claw portion 80f2 protruding horizontally from the third vertical wall 80f1.

Fabrication of Electrode Body

The first positive electrode tab group 40a, the second positive electrode tab group 40b, the first negative electrode tab group 50a, and the second negative electrode tab group 50b are curved such that the upper surface of the first electrode body element 3a and the upper surface of the second electrode body element 3b in FIG. 8 are in contact with each other directly or with another member therebetween. Thereby, the first electrode body element 3a and the second electrode body element 3b are integrated to form one electrode body 3. The first electrode body element 3a and the second electrode body element 3b are preferably integrated using a tape or the like. Alternatively, the first electrode body element 3a and the second electrode body element 3b are preferably integrated by being disposed in an electrode body holder 15 formed into a box shape or a bag shape.

When integrating the first electrode element 3a and the second electrode element 3b, the insulating sheet 19 is preferably bent together.

When integrating the first electrode element 3a and the second electrode element 3b, the insulating plate 80 is preferably disposed between the positive electrode collector 6 and the electrode body 3, and between the negative electrode collector 10 and the electrode body 3.

The first positive electrode tab group 40a and the second positive electrode tab group 40b are connected to the surface of the positive electrode collector 6 on the electrode body 3 side in a state curved in different directions. The first negative electrode tab group 50a and the second negative electrode tab group 50b are connected to the surface of the negative electrode collector 10 on the electrode body 3 side in a state curved in different directions.

Assembly of Secondary Battery

The electrode body 3 disposed in the electrode body holder 15 is inserted into the prismatic outer casing 1, and the sealing plate 2 and the prismatic outer casing 1 are welded to each other. Thereby, the opening of the prismatic outer casing 1 is sealed by the sealing plate 2. After electrolyte is injected into the battery case 100 through the electrolyte injection hole 17 provided in the sealing plate 2, the electrolyte injection hole 17 is sealed by the sealing member 18. Thereby, the prismatic secondary battery 20 is completed.

Modification 1

Figure 11A:
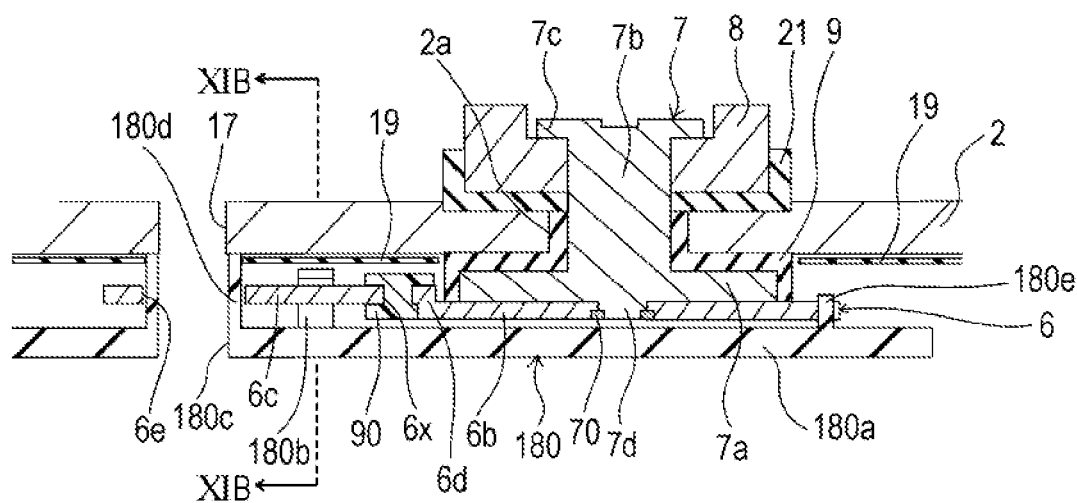
FIG. 11A is a cross-sectional view of the vicinity of the positive electrode terminal in a secondary battery according to Modification 1 taken in the longitudinal direction of the sealing plate.
Figure 11B:
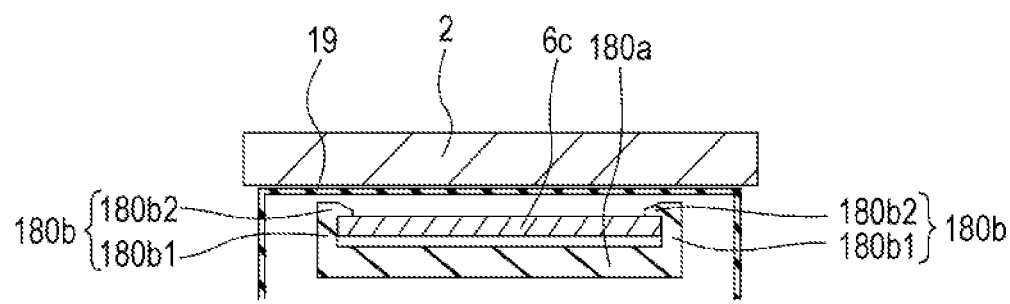
FIG. 11B is a cross-sectional view of the vicinity of the positive electrode terminal in the secondary battery according to Modification 1 taken in the widthwise direction of the sealing plate.

FIGS. 11A and 11B are views corresponding to FIGS. 9A and 9B of a prismatic secondary battery according to Modification 1. The prismatic secondary battery according to Modification 1 differs from the prismatic secondary battery 20 according to the above embodiment only in the shapes of the positive electrode collector and the insulating plate. The insulating plate 180 has a main body portion 180a disposed along the surface of the electrode body 3 on the sealing plate 2 side. The main body portion 180a has first protruding portions 180b. The first protruding portions 180b are connected to the second region 6c of the positive electrode collector 6.

As shown in FIG. 11B, the first protruding portions 180b each has a first vertical wall 180b1 protruding from the main body portion 180a toward the sealing plate 2 and a first claw portion 180b2 protruding horizontally from the first vertical wall 180b1.

A first opening 180c is provided at a position corresponding to the electrolyte injection hole 17 in the main body portion 180a. On the edge of the first opening 180c, a tubular protruding portion 180d extending toward the sealing plate 2 is provided. The main body portion 180a has a second protruding portion 180e. The second protruding portion 180e is inserted into a through-hole 6y provided in the first region 6b of the positive electrode collector 6.

An outer side insulating member 21 made of resin can be disposed between the positive electrode external conductive member 8 and the sealing plate 2 to insulate the positive electrode external conductive member 8 and the sealing plate 2 from each other.

Modification 2

Figure 12:
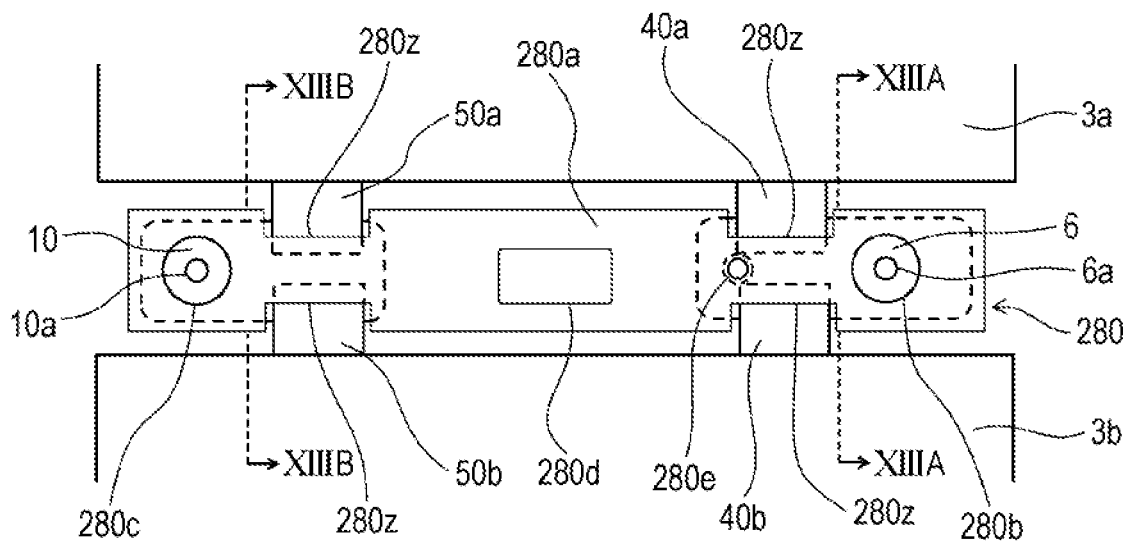
FIG. 12 relates to a secondary battery according to Modification 2, and shows a state in which an insulating plate is connected to the positive electrode collector and the negative electrode collector.

An insulating plate can be connected to the positive electrode collector 6 and the negative electrode collector 10 before connecting the positive electrode collector 6 and the negative electrode collector 10 to the positive electrode terminal 7 and the negative electrode terminal 11, respectively. FIG. 12 is a view showing a state where an insulating plate 280 is connected to the positive electrode collector 6 and the negative electrode collector 10.

The insulating plate 280 has a main body portion 280a disposed along the surface of the electrode body 3 on the sealing plate 2 side. The main body portion 280a is provided with a first opening 280b, a second opening 280c, a third opening 280d, and a fourth opening 280e. The first opening 280b is provided at a position facing a portion where the positive electrode terminal 7 and the positive electrode collector 6 are to be connected to each other. An energy beam is irradiated through the first opening 280b, and the positive electrode terminal 7 and the positive electrode collector 6 are welded to each other. The second opening 280c is provided at a position facing a portion where the negative electrode terminal 11 and the negative electrode collector 10 are to be connected to each other. An energy beam is irradiated through the second opening 280c, and the negative electrode terminal 11 and the negative electrode collector 10 are welded to each other. The third opening 280d is provided at a position facing the gas discharge valve 16 provided in the sealing plate 2. The fourth opening 280e is provided at a position facing the electrolyte injection hole 17 provided in the sealing plate 2.

Figure 13A:
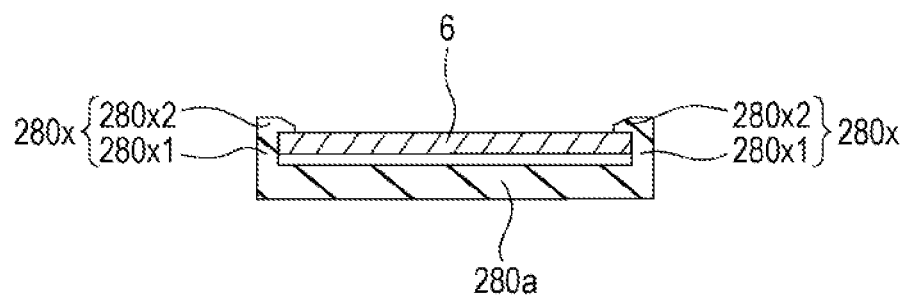
FIG. 13A is a cross-sectional view taken along line XIIIA-XIIIA of FIG. 12.
Figure 13B:
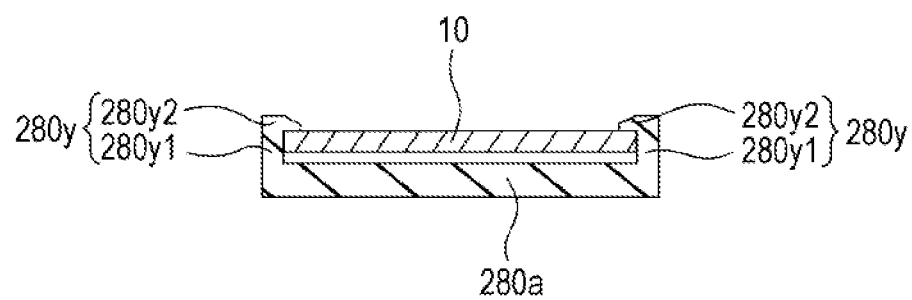
FIG. 13B is a cross-sectional view taken along line XIIIB-XIIIB of FIG. 12.

FIG. 13A is a cross-sectional view taken along line XIIIA-XIIIA of FIG. 12. FIG. 13B is a cross-sectional view taken along line XIIIB-XIIIB of FIG. 12. The upper side in FIGS. 13A and 13B is the sealing plate 2 side. The first protruding portions 280x each have a first vertical wall 280x1 extending from the main body portion 280a toward the sealing plate 2 and a first claw portion 280x2 protruding horizontally from the first vertical wall 280x1. The second protruding portions 280y each have a second vertical wall 280y1 extending from the main body portion 280a toward the sealing plate 2 and a second claw portion 280y2 protruding horizontally from the second vertical wall 280y1.

When the insulating plate 280 is connected to the positive electrode collector 6 and the negative electrode collector 10 before connecting the positive electrode collector 6 and the negative electrode collector 10 to the positive electrode terminal 7 and the negative electrode terminal 11, respectively, as in Modification 2, the insulating plate 280 can be more easily connected to the positive electrode collector 6 and the negative electrode collector 10.

It is not necessary to connect the insulating plate 280 to both the positive electrode collector 6 and the negative electrode collector 10. The insulating plate 280 may be connected only to the positive electrode collector 6.

The main body portion 280a is preferably provided with cutout portions 280z. The first positive electrode tab group 40a, the second positive electrode tab group 40b, the first negative electrode tab group 50a, and the second negative electrode tab group 50b preferably pass through the cutout portion 280z. This effectively prevents damage to the first positive electrode tab group 40a, the second positive electrode tab group 40b, the first negative electrode tab group 50a, and the second negative electrode tab group 50b.

Method for Connecting Positive Electrode Collector and Insulating Plate

Another example of the method for connecting the positive electrode collector and the insulating plate will be described. The parts not described can have the same configurations as those of the prismatic secondary battery 20 according to the above embodiment.

Figure 14A:
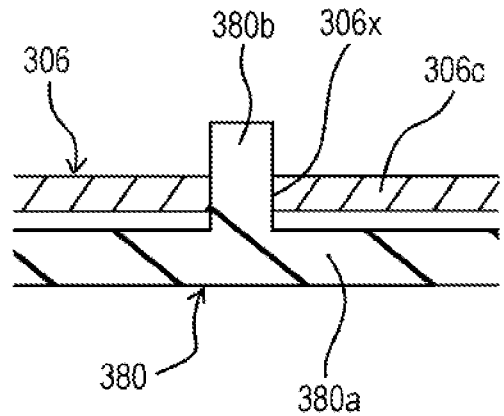
FIGS. 14A to 14C show methods for connecting a positive electrode collector and an insulating plate.

As shown in FIG. 14A, a through-hole 306x can be provided in the second region 306c which is a region in the positive electrode collector 306 closer to the part connected to the positive electrode tab than the fuse portion. The main body portion 380a of the insulating plate 380 is provided with a protruding portion 380b. The protruding portion 380b is fitted in the through-hole 306x, and the positive electrode collector 306 and the insulating plate 380 are connected to each other.

Figure 14B:
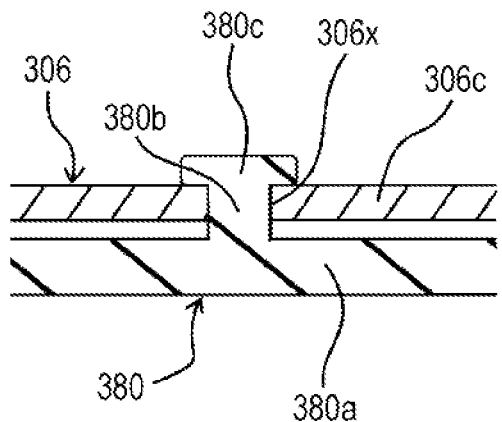

As shown in FIG. 14B, the distal end of the protruding portion 380b may be expanded by heat caulking or the like to provide an enlarged diameter portion 380c.

Figure 14C:
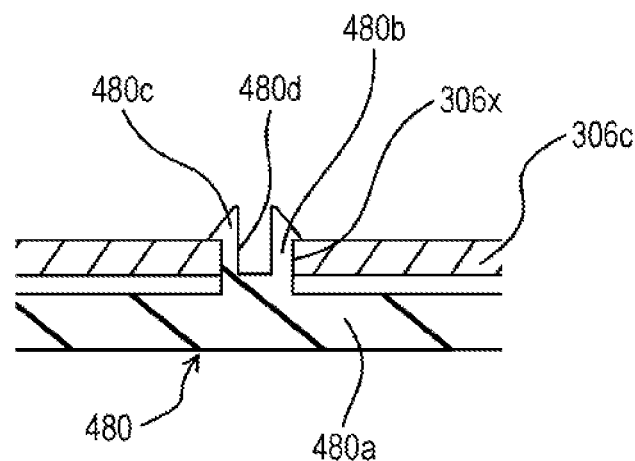

As shown in FIG. 14C, the main body portion 480a of the insulating plate 480 can be provided with a protruding portion 480b. An enlarged diameter portion 480c can be provided at the distal end of the protruding portion 480b.

The protruding portion 480b can be inserted into the through-hole 306x, and the positive electrode collector 306 and the insulating plate 480 can be connected to each other. A recessed portion 480d is preferably provided at the distal end of the enlarged diameter portion 480c.

Figure 15:
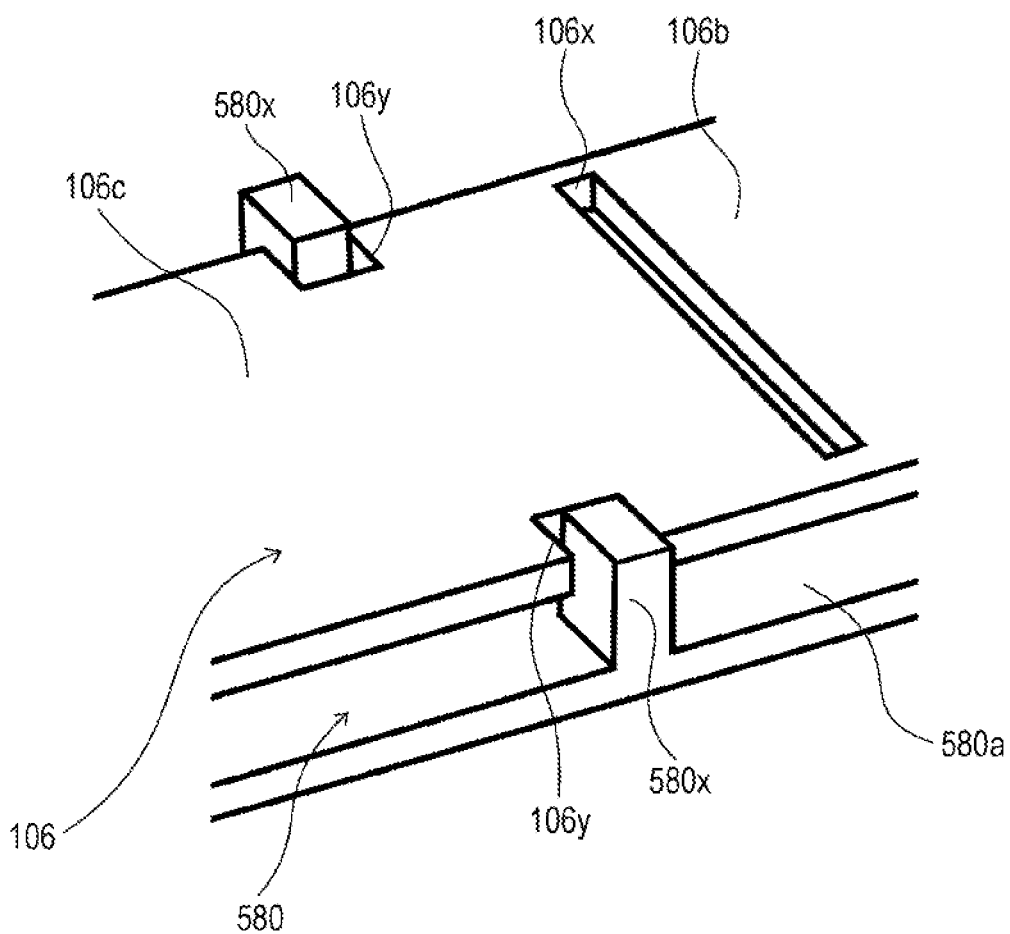
FIG. 15 shows a method for connecting a positive electrode collector and an insulating plate.

FIG. 15 is a view showing another example of the method for connecting the positive electrode collector and the insulating plate. The positive electrode collector 106 is provided with a fuse portion 106x. Cutout portions 106y are provided in the second region 106c which is a region in the positive electrode collector 106 closer to the part connected to the positive electrode tab than the fuse portion 106x. The insulating plate 580 has a main body portion 580a disposed along the surface of the electrode body 3 on the sealing plate 2 side and a first protruding portions 580x protruding from the main body portion 580a toward the sealing plate 2. The first protruding portions 580x are disposed in the cutout portions 106y. The first protruding portions 580x are preferably fitted in the cutout portions 106y. However, gaps may be formed between the first protruding portions 580x and the cutout portions 106y. In the direction connecting the first region 106b and the second region 106c (the longitudinal direction of the positive electrode collector 106), the size of the gaps between the first protruding portions 580x and the cutout portions 106y is preferably smaller than the size of the gaps generated between the first region 106b and the second region 106c when the fuse portion 106x blows.

Modification 3

The prismatic secondary battery according to Modification 3 differs from the prismatic secondary battery 20 according to the above embodiment in the configuration in the vicinity of the positive electrode terminal. The parts not described can have the same configurations as those of the prismatic secondary battery 20.

Figure 16A:
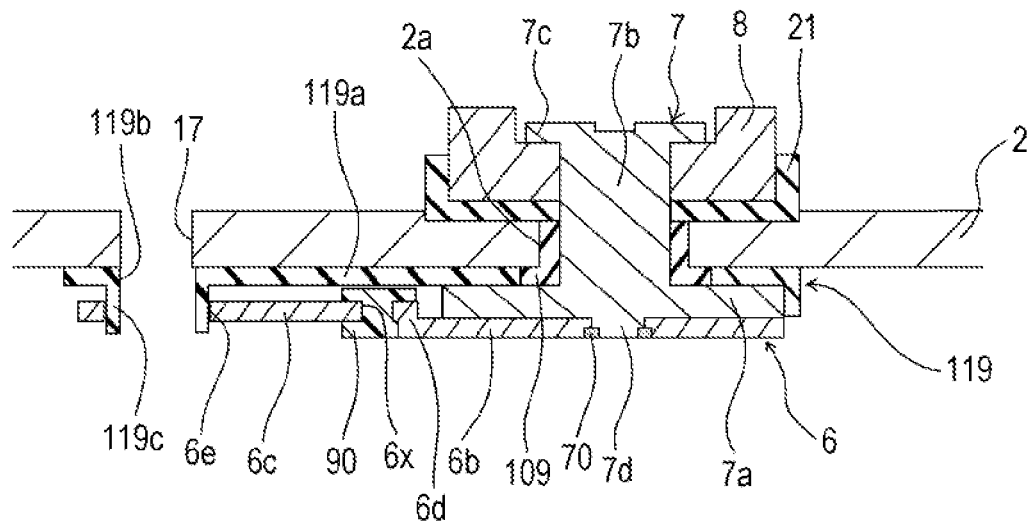
FIG. 16A is a cross-sectional view of the vicinity of the positive electrode terminal of a prismatic secondary battery according to Modification 3 taken in the longitudinal direction of the sealing plate.
Figure 16B:
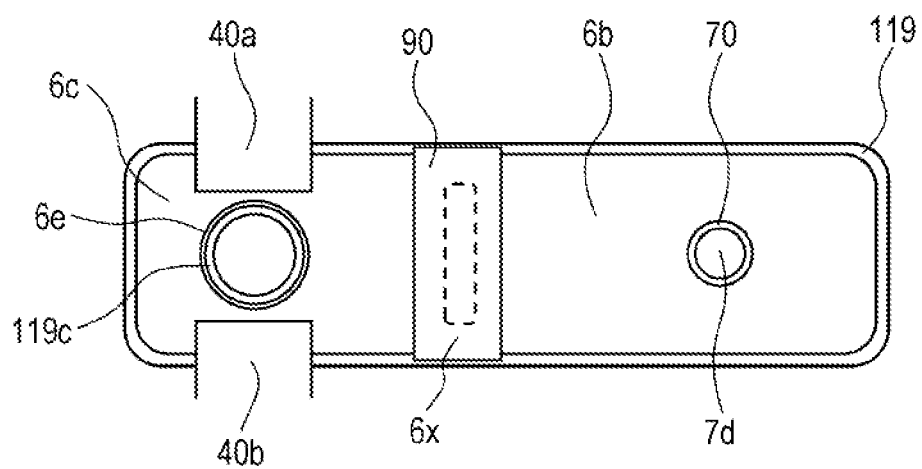
FIG. 16B shows the electrode body side surface of a positive electrode collector of the prismatic secondary battery according to Modification 3.

FIGS. 16A and 16B show the structure in the vicinity of the positive electrode terminal of the prismatic secondary battery according to Modification 3. An insulating sealing member 109 is disposed between the sealing plate 2 and the positive electrode terminal 7. An insulating member 119 made of resin is disposed between the sealing plate 2 and the positive electrode collector 6. The insulating member 119 has a main body portion 119a disposed along the sealing plate 2. In the main body 119a, an insulating member opening 119b is provided at a position facing the electrolyte injection hole 17. A tubular protruding portion 119c protruding from the main body portion 119a toward the electrode body 3 is provided around the insulating member opening 119b. The protruding portion 119c is disposed in the collector opening 6e provided in the second region 6c of the positive electrode collector 6. With such a configuration, the second region 6c can be prevented from moving toward the first region 6b after the fuse portion 6x blows. In the longitudinal direction of the sealing plate 2, the distance between the inner surface of the collector opening 6e and the outer surface of the protruding portion 119c is preferably smaller than the size of the gap generated between the first region 6b and the second region 6c when the fuse portion 6x blows.

The outer side insulating member 21 is disposed between the positive electrode terminal 7 and the sealing plate 2, and the positive electrode terminal 7 and the sealing plate 2 are electrically insulated from each other. The outer side insulating member 21 may be omitted or the outer side insulating member 21 may be replaced with a conductive member so that the positive electrode terminal 7 and the sealing plate 2 are electrically connected to each other.

Modification 4

The prismatic secondary battery according to Modification 4 differs from the prismatic secondary battery 20 according to the above embodiment in the configuration in the vicinity of the positive electrode terminal. The parts not described can have the same configurations as those of the prismatic secondary battery 20.

Figure 17A:
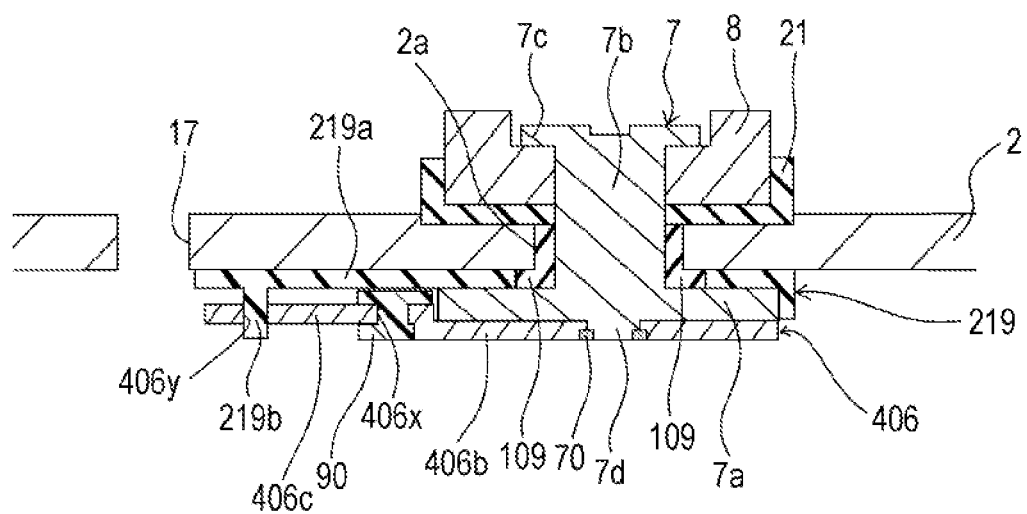
FIG. 17A is a cross-sectional view of the vicinity of the positive electrode terminal of a prismatic secondary battery according to Modification 4 taken in the longitudinal direction of the sealing plate.
Figure 17B:
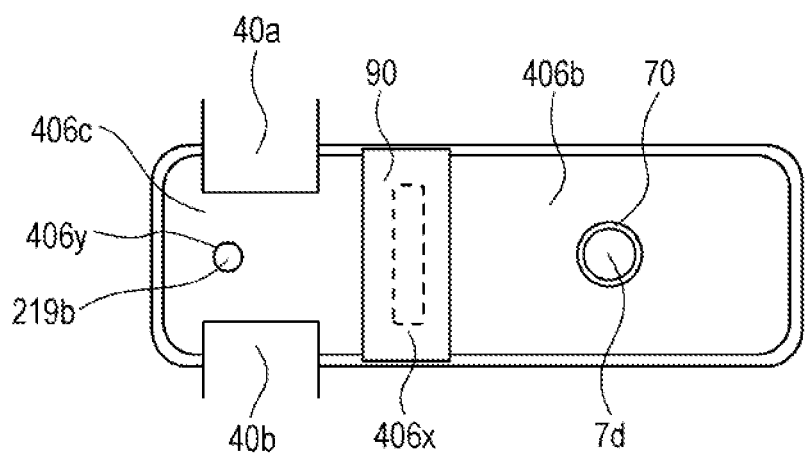
FIG. 17B shows the electrode body side surface of a positive electrode collector of the prismatic secondary battery according to Modification 4.

FIGS. 17A and 17B show the structure in the vicinity of the positive electrode terminal of the prismatic secondary battery according to Modification 4. An insulating sealing member 109 is disposed between the sealing plate 2 and the positive electrode terminal 7. An insulating member 219 made of resin is disposed between the sealing plate 2 and the positive electrode collector 406. The insulating member 219 has a main body portion 219a disposed along the sealing plate 2. The main body portion 219a has a protruding portion 219b protruding from the main body portion 219a toward the electrode body 3. The positive electrode collector 406 has a fuse portion 406x. The fuse portion 406x is covered by the resin member 90. The positive electrode collector 406 has a first region 406b located closer to the part connected to the positive electrode terminal 7 than the fuse portion 406x and a second region 406c located closer to the part connected to the positive electrode tab than the fuse portion 406x. The second region 406c is provided with an opening 406y. The protruding portion 219b is disposed in the opening 406y. With such a configuration, the second region 406c can be prevented from moving toward the first region 406b after the fuse portion 406x blows. In the longitudinal direction of the sealing plate 2, the distance between the inner surface of the opening 406y and the outer surface of the protruding portion 219b is preferably smaller than the size of the gap generated between the first region 406b and the second region 406c when the fuse portion 6x blows.

Modification 5

The prismatic secondary battery according to Modification 5 differs from the prismatic secondary battery 20 according to the above embodiment in the configuration in the vicinity of the positive electrode terminal. The parts not described can have the same configurations as those of the prismatic secondary battery 20.

Figure 18A:
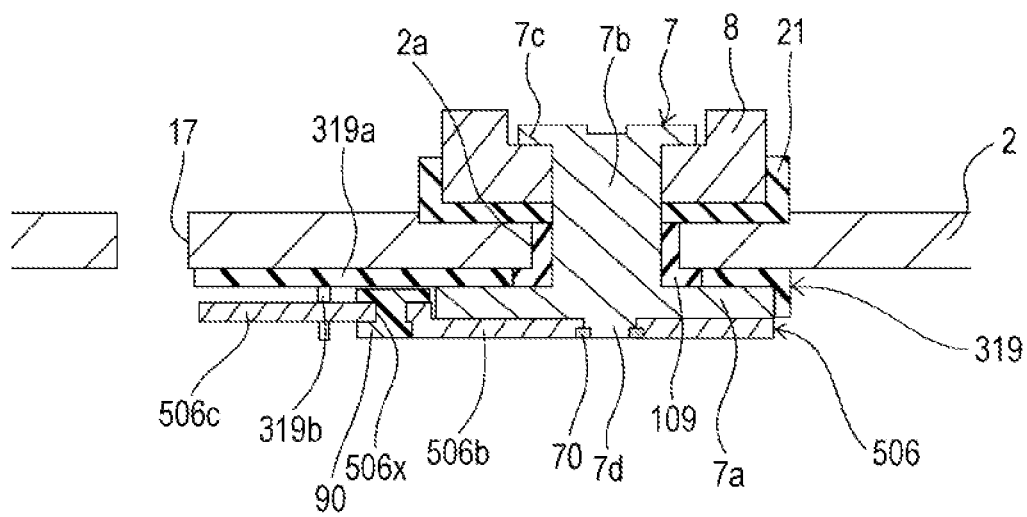
FIG. 18A is a cross-sectional view of the vicinity of the positive electrode terminal of a prismatic secondary battery according to Modification 5 taken in the longitudinal direction of the sealing plate.
Figure 18B:
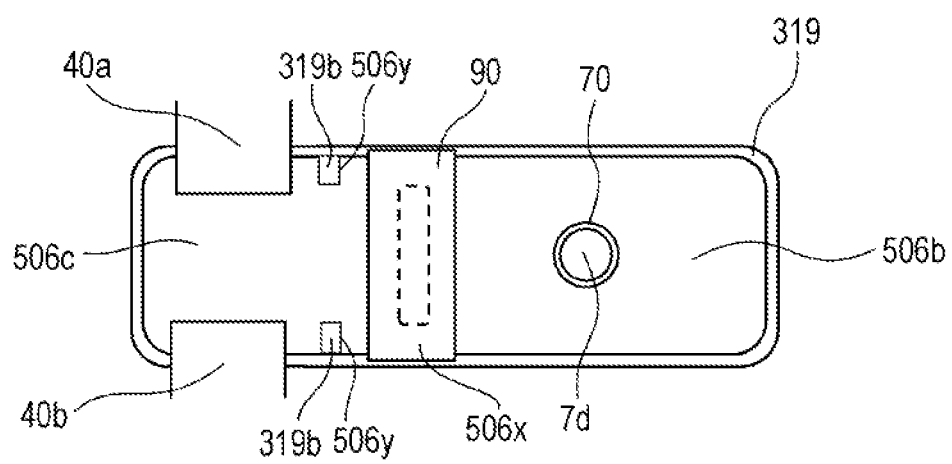
FIG. 18B shows the electrode body side surface of a positive electrode collector of the prismatic secondary battery according to Modification 5.

FIGS. 18A and 18B show the structure in the vicinity of the positive electrode terminal of the prismatic secondary battery according to Modification 5. An insulating sealing member 109 is disposed between the sealing plate 2 and the positive electrode terminal 7. An insulating member 319 made of resin is disposed between the sealing plate 2 and the positive electrode collector 506. The insulating member 319 has a main body portion 319a disposed along the sealing plate 2. The main body portion 319a has protruding portions 319b protruding from the main body portion 319a toward the electrode body 3. The positive electrode collector 506 has a fuse portion 506x. The fuse portion 506x is covered by the resin member 90. The positive electrode collector 506 has a first region 506b located closer to the part connected to the positive electrode terminal 7 than the fuse portion 506x and a second region 506c located closer to the part connected to the positive electrode tab than the fuse portion 506x. The second region 506c is provided with cutout portions 506y. The protruding portions 319b are disposed in the cutout portions 506y. With such a configuration, the second region 506c can be prevented from moving toward the first region 506b after the fuse portion 506x blows. In the longitudinal direction of the sealing plate 2, the distance between the inner surfaces of the cutout portions 506y and the outer surfaces of the protruding portions 319b is preferably smaller than the size of the gap generated between the first region 506b and the second region 506c when the fuse portion 506x blows.

The outer side insulating member 21 is disposed between the positive electrode terminal 7 and the sealing plate 2, and the positive electrode terminal 7 and the sealing plate 2 are electrically insulated from each other. The outer side insulating member 21 may be omitted or the outer side insulating member 21 may be replaced with a conductive member so that the positive electrode terminal 7 and the sealing plate 2 are electrically connected to each other.

Others

In the above embodiment, the electrode body 3 is composed of two electrode body elements, but the present invention is not limited to this. The electrode body 3 may be composed of three or more electrode body elements. The electrode body elements are not limited to stacked electrode bodies, and may be rolled electrode bodies in which an elongated positive electrode plate and an elongated negative electrode plate are rolled with an elongated separator therebetween. The electrode body 3 may be a single stacked electrode body. The electrode body 3 may be a single rolled electrode body.

The thickness of the insulating sheet 19 is preferably 0.01 mm to 0.5 mm, more preferably 0.05 mm to 0.2 mm, and still more preferably 0.1 mm to 0.17 mm.

The insulating sheet 19 is preferably a resin sheet. The insulating sheet is preferably made, for example, of polypropylene (PP), polyethylene (PE), polyethylene naphthalate (PEN), polytetrafluoroethylene (PTFE), polyphenylene sulfide (PPS), polyimide, polyester, or polyphenylene ether.

The insulating sheet preferably has a high heat resistance (for example, a melting point of 200° C. or higher).

The insulating plate is preferably made of resin. The insulating plate is preferably made, for example, of polypropylene (PP), polyethylene (PE), polyethylene naphthalate (PEN), polytetrafluoroethylene (PTFE), polyphenylene sulfide (PPS), polyimide, polyester, or polyphenylene ether.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A secondary battery comprising:
an electrode body having a positive electrode plate and a negative electrode plate;
an outer casing having an opening and accommodating the electrode body;
a sealing plate sealing the opening;
a terminal attached to the sealing plate; and
a collector electrically connecting the positive electrode plate or the negative electrode plate to the terminal,
wherein the positive electrode plate or the negative electrode plate has a tab,
wherein the collector has a part connected to the tab and a part connected to the terminal,
wherein, in the collector, a fuse portion is provided between the part connected to the tab and the part connected to the terminal,
wherein an insulating member is disposed between the collector and the electrode body,
wherein a region in the collector closer to the part connected to the terminal than the fuse portion is referred to as a first region,
wherein a region in the collector closer to the part connected to the tab than the fuse portion is referred to as a second region,
wherein the secondary battery has a movement prevention structure that prevents the second region from moving so as to approach at least one of the sealing plate and the first region after the fuse portion blows, and
wherein the movement prevention structure includes the second region and the insulating member.

2. The secondary battery according to claim 1, wherein the tab extends from a surface of the electrode body, and wherein the surface faces to the sealing plate.

3. The secondary battery according to claim 1,
wherein the second region is provided with a through-hole or a cutout portion, and
wherein a part of the insulating member is disposed in the through-hole or the cutout portion.

4. The secondary battery according to claim 1,
wherein an insulating sheet is disposed between the sealing plate and the second region.

5. The secondary battery according to claim 1,
wherein the insulating member is connected to the first region.

6. The secondary battery according to claim 1,
wherein the insulating member has a main body portion disposed along a surface of the electrode body on a sealing plate side and a protruding portion protruding from the main body portion toward the sealing plate, and
wherein a part of the protruding portion is located closer to the sealing plate than a surface of the first region on the sealing plate side.

7. The secondary battery according to claim 6, wherein a part of the protruding portion is disposed between the first region and the sealing plate.

8. A secondary battery comprising:
an electrode body having a positive electrode plate and a negative electrode plate;
an outer casing having an opening and accommodating the electrode body;
a sealing plate sealing the opening;
a terminal attached to the sealing plate; and
a collector electrically connecting the positive electrode plate or the negative electrode plate to the terminal,
wherein the positive electrode plate or the negative electrode plate has a tab,
wherein the collector has a part connected to the tab and a part connected to the terminal,
wherein, in the collector, a fuse portion is provided between the part connected to the tab and the part connected to the terminal,
wherein an insulating member is disposed between the sealing plate and the collector,
wherein a region in the collector closer to the part connected to the terminal than the fuse portion is referred to as a first region,
wherein a region in the collector closer to the part connected to the tab than the fuse portion is referred to as a second region,
wherein the secondary battery has a movement prevention structure that prevents the second region from moving so as to approach at least one of the sealing plate and the first region after the fuse portion blows, wherein the movement prevention structure includes the second region and the insulating member, wherein the second region is provided with a through-hole or a cutout portion, and wherein a part of the insulating member is disposed in the through-hole or the cutout portion.

9. A secondary battery comprising:
an electrode body having a positive electrode plate and a negative electrode plate;
an outer casing having an opening and accommodating the electrode body;
a sealing plate sealing the opening;
a terminal attached to the sealing plate; and
a collector electrically connecting the positive electrode plate or the negative electrode plate to the terminal,
wherein the positive electrode plate or the negative electrode plate has a tab,
wherein the collector has a part connected to the tab and a part connected to the terminal,
wherein, in the collector, a fuse portion is provided between the part connected to the tab and the part connected to the terminal,
wherein an insulating member is disposed between the sealing plate and the collector,
wherein a region in the collector closer to the part connected to the terminal than the fuse portion is referred to as a first region,
wherein a region in the collector closer to the part connected to the tab than the fuse portion is referred to as a second region,
wherein the secondary battery has a movement prevention structure that prevents the second region from moving so as to approach at least one of the sealing plate and the first region after the fuse portion blows,
wherein the movement prevention structure includes the second region and the insulating member,
wherein the insulating member has a terminal through-hole, and
wherein the terminal is disposed in the terminal through-hole.

10. A secondary battery comprising:
an electrode body having a positive electrode plate and a negative electrode plate;
an outer casing having an opening and accommodating the electrode body;
a sealing plate sealing the opening;
a terminal attached to the sealing plate; and
a collector electrically connecting the positive electrode plate or the negative electrode plate to the terminal,
wherein the positive electrode plate or the negative electrode plate has a tab,
wherein the collector has a part connected to the tab and a part connected to the terminal,
wherein, in the collector, a fuse portion is provided between the part connected to the tab and the part connected to the terminal,
wherein an insulating member is disposed between the sealing plate and the collector,
wherein a region in the collector closer to the part connected to the terminal than the fuse portion is referred to as a first region,
wherein a region in the collector closer to the part connected to the tab than the fuse portion is referred to as a second region,
wherein the secondary battery has a movement prevention structure that prevents the second region from moving so as to approach at least one of the sealing plate and the first region after the fuse portion blows,
wherein the movement prevention structure includes the second region and the insulating member, and,
wherein the insulating member is sandwiched between the terminal and the sealing plate.

11. The secondary battery according to claim 1, wherein the fuse portion is covered by a resin member.

12. The secondary battery according to claim 1,
wherein the electrode body has a first tab group including a plurality of the tabs and a second tab group including a plurality of the tabs, and
wherein the first tab group and the second tab group are curved in different directions.

* * * * *